(12) United States Patent
Yuan

(10) Patent No.: US 11,374,629 B2
(45) Date of Patent: Jun. 28, 2022

(54) METHODS FOR PROVIDING CHANNEL STATE INFORMATION AND PRECODING INFORMATION BETWEEN A REMOTE RADIO UNIT AND A BASEBAND UNIT

(71) Applicant: Intel Corporation, Santa Clara, CA (US)

(72) Inventor: Fang Yuan, Beijing (CN)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 16/499,937

(22) PCT Filed: May 11, 2017

(86) PCT No.: PCT/CN2017/083976
§ 371 (c)(1),
(2) Date: Oct. 1, 2019

(87) PCT Pub. No.: WO2018/205231
PCT Pub. Date: Nov. 15, 2018

(65) Prior Publication Data
US 2021/0119674 A1    Apr. 22, 2021

(51) Int. Cl.
*H04W 72/04* (2009.01)
*H04B 7/0456* (2017.01)
*H04L 5/00* (2006.01)

(52) U.S. Cl.
CPC ......... *H04B 7/0456* (2013.01); *H04L 5/0053* (2013.01); *H04W 72/0446* (2013.01)

(58) Field of Classification Search
CPC ........... H04W 72/0446; H04W 72/042; H04W 72/0453; H04W 72/1289; H04W 24/10; H04W 72/02; H04W 72/0406; H04W 72/046; H04W 56/001; H04W 24/08; H04W 72/0413; H04W 74/0833; H04L 5/0048; H04L 25/0204; H04L 25/0224; H04L 5/0007; H04L 1/0026; H04L 27/34;
(Continued)

(56) References Cited

U.S. PATENT DOCUMENTS

2016/0156401 A1* 6/2016 Onggosanusi ....... H04B 7/0478
                                                                 370/329
2017/0366316 A1* 12/2017 Kim .................... H04B 7/0417
(Continued)

FOREIGN PATENT DOCUMENTS

CN    103918195 A    7/2014
CN    105191465 A   12/2015
(Continued)

OTHER PUBLICATIONS

China Patent Office, PCT International Search Report issued for PCT/CN2017/03976, 4 pgs., dated Feb. 2, 2018.

*Primary Examiner* — Eva Y Puente
(74) *Attorney, Agent, or Firm* — Banner & Witcoff Ltd.

(57) ABSTRACT

This disclosure relates to a method for providing channel state information (CSI) from a remote radio unit (RRU) to a baseband unit (BBU), the method comprising: determining CSI for each user equipment (UE) of a plurality of UEs based on a reference signal received from the respective UE; generating a plurality of correlation coefficients based on the CSI; and providing the plurality of correlation coefficients to the BBU.

23 Claims, 7 Drawing Sheets

(58) Field of Classification Search
CPC ............ H04L 25/03343; H04L 1/0003; H04L
1/0009; H04L 43/0864; H04L 5/0051;
H04L 25/024; H04B 7/0626; H04B
7/0452; H04B 7/0413; H04B 7/0417;
H04B 7/0456; H04B 7/0632; H04B 7/10;
H04B 17/336; H04B 7/024; H04B
7/0469; H04B 7/0689; H04B 17/27;
H04B 7/0617
USPC ......................................................... 370/329
See application file for complete search history.

(56) References Cited

U.S. PATENT DOCUMENTS

2018/0278313 A1* 9/2018 Kim ..................... H04B 7/0626
2018/0309555 A1* 10/2018 Wang .................. H04W 72/042
2020/0178219 A1* 6/2020 Hoshino ............... H04L 1/0027

FOREIGN PATENT DOCUMENTS

WO    WO-2014/015660 A1    1/2014
WO    WO-2016/163972 A1    10/2016

* cited by examiner

METHODS FOR PROVIDING CHANNEL STATE INFORMATION AND PRECODING INFORMATION BETWEEN A REMOTE RADIO UNIT AND A BASEBAND UNIT

FIELD

The disclosure relates to methods and devices for providing channel state information (CSI) and precoding information between a remote radio unit (RRU) and a baseband unit (BBU) of a base station. In particular, the disclosure relates to a scheme for delivering a large amount of CSI in fronthaul from a RRU to a BBU for multi-user massive MIMO systems.

BACKGROUND

An eNB of a massive MIMO system 100 as shown in FIG. 1 may be typically implemented by two function units: a remote radio unit (RRU) 110, and a baseband unit (BBU) 120. The RRU 110 is deployed with a large antenna array providing functions of radio transmission/reception and also some simple signal preprocessing like FFT/iFFT and channel estimation. The BBU 120 is responsible for advanced baseband signal processing like UE scheduling, precoding, and channel coding/decoding. To perform MIMO transmission, the CSI of each UE 141, 142, 143, 144, 145, i.e., MIMO vector, must be delivered from the RRU 110 to the BBU 120 via fronthaul link 130 for the purpose of MIMO scheduling and precoding at BBU 120.

In conventional solutions, all CSI of each UE 141, 142, 143, 144, 145 is delivered from the RRU 110 to the BBU 120. The amount of CSI-related information to be delivered increases significantly with the size of the antenna array. Existing CSI delivery solutions consume a nontrivial amount of fronthaul bandwidth and thus become a challenging issue in implementing massive MIMO systems. Hence, there is a need to provide an improved CSI delivery scheme for reducing the required bandwidth in the fronthaul of multi-user (MU) massive MIMO systems.

BRIEF DESCRIPTION OF THE DRAWINGS

The accompanying drawings are included to provide a further understanding of examples and are incorporated in and constitute a part of this specification. The drawings illustrate examples and together with the description serve to explain principles of examples. Other examples and many of the intended advantages of examples will be readily appreciated as they become better understood by reference to the following detailed description.

DETAILED DESCRIPTION

Figure 1:
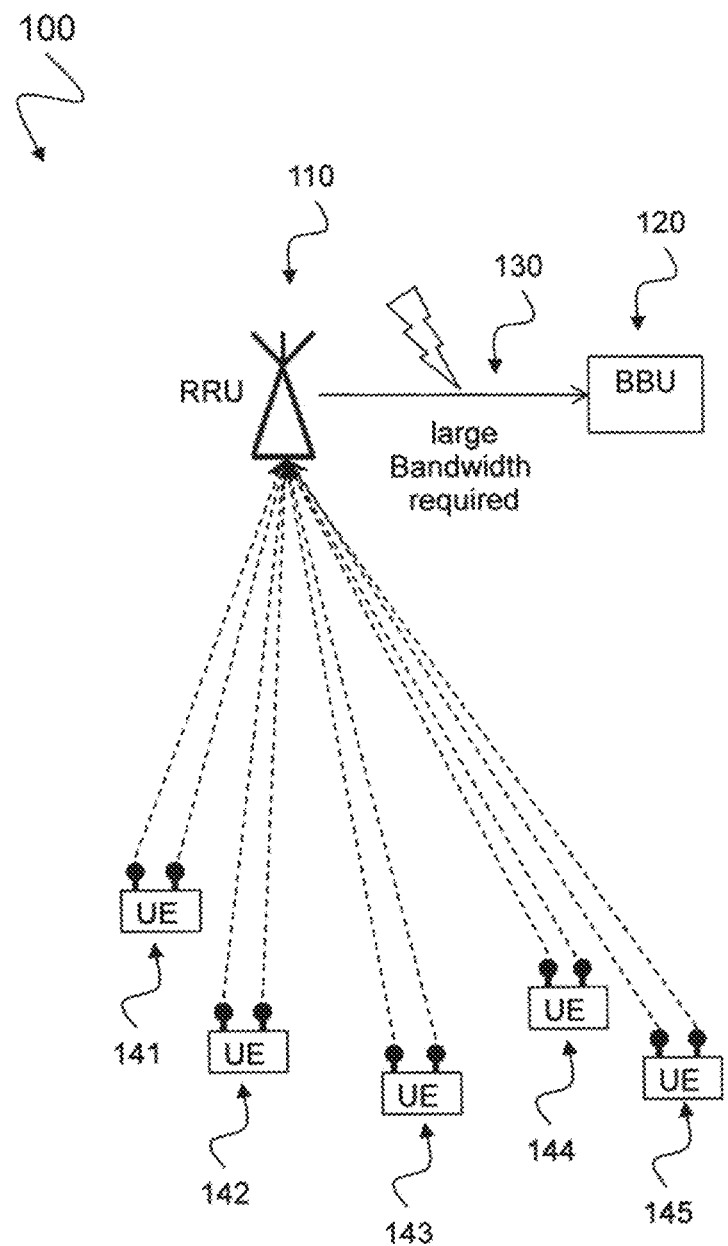
FIG. 1 is a schematic diagram illustrating a MIMO system with multiple user equipments (UEs) and a base station system including a remote radio unit (RRU) and a baseband unit (BBU).

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description is therefore not to be taken in a limiting sense, and the scope of the present disclosure is defined by the appended claims.

The following terms, abbreviations and notations will be used herein:
RRU: Remote Radio Unit
BBU: Baseband Unit
CSI: Channel State Information
MU: Multiuser
MIMO: Multiple Input Multiple Output
RF: Radio Frequency
LTE: Long Term Evolution
UE: User Equipment, mobile device, mobile terminal
OFDM: Orthogonal Frequency Division Multiplex
eNB: Base station
eNodeB: Base station.

The methods and devices described herein may be applied in base stations and base station systems including an RRU and a BBU which may be coupled via a fronthaul link. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other unless specifically noted otherwise.

The methods and devices described herein may be implemented in wireless communication networks, in particular communication networks based on mobile communication standards such as LTE, in particular LTE-A and/or OFDM and successor standards such as 5G. The methods are also applicable for connectivity standards, in particular high speed standards from the 802.11 family e.g. 802.11ad and successor standards. The methods and devices described below may be implemented in electronic devices, in particular electronic circuits of base stations (eNodeB, eNB, access point) with RRUs and BBUs. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals and performing associated signal processing. Radio signals may be or may include radio frequency signals radiated by a radio transmitting device (or radio transmitter or sender) with a radio frequency lying in a range of about 3 kHz to about 300

GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE, marketed as 4G LTE and future 5G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in Multiple-input multiple-output (MIMO) systems, in particular multiuser MIMO systems and diversity receivers. MIMO wireless communication systems employ multiple antennas at the transmitter and/or at the receiver to increase system capacity and to achieve better quality of service. In spatial multiplexing mode, MIMO systems may reach higher peak data rates without increasing the bandwidth of the system by transmitting multiple data streams in parallel in the same frequency band. A diversity receiver uses two or more antennas to improve the quality and reliability of a wireless link.

In the following, examples are described with reference to the drawings, wherein like reference numerals are generally utilized to refer to like elements throughout. In the following description, for purposes of explanation, numerous specific details are set forth in order to provide a thorough understanding of one or more aspects of examples. However, it may be evident to a person skilled in the art that one or more aspects of the examples may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects are merely examples and that other aspects may be utilized and structural and functional modifications may be made without departing from the scope of the present disclosure.

In the following, different solutions for delivering CSI information from an RRU to a BBU are described. A simple solution is to deliver the explicit CSI of all UEs, i.e. a MU-MIMO channel matrix H of size N*K, from the RRU to the BBU in fronthaul, where N is the number of antenna array and K is the number of UE. As the value of N becomes large in massive MIMO system, the size of CSI consumes much more bandwidth in the fronthaul. Although compression techniques are applied in fronthaul, the amount of CSI-related information to be delivered still increases significantly with the size of antenna array.

The solution as described in this disclosure, which may be referred to as the two-part design or two-part solution, is to introduce an implicit CSI delivery scheme. That is, delivering the correlation-relationship matrix among the CSI of all UEs, i.e., $H^H H$ of size K*K, which does not scale up in massive MIMO system. It is shown that at the BBU, the knowledge of $H^H H$ can function the same to that of H, when used in MIMO scheduling and precoding without any performance loss. Thus, the two-part solution according to the disclosure can overcome the drawback of the above-indexed simple solution as described in the following.

Figure 2:
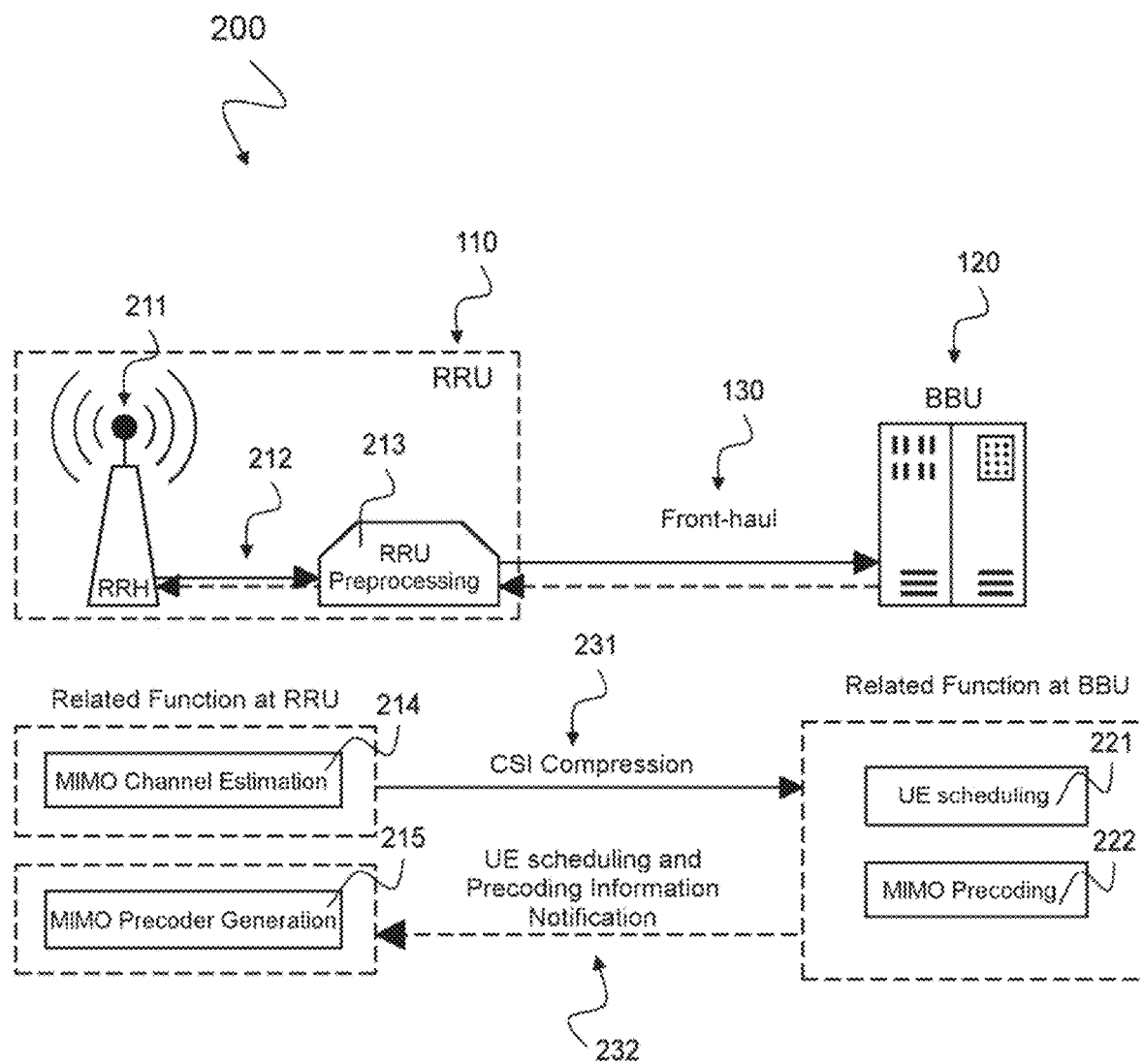
FIG. 2 is a schematic diagram illustrating a massive MIMO eNB example with RRU and BBU function partition according to the disclosure.

FIG. 2 is a schematic diagram illustrating a massive MIMO eNB example 200 with RRU 110 and BBU 120 function partition according to the disclosure. Functions of the RRU 110 include MIMO channel estimation 214 and MIMO precoder generation 215 while functions of the BBU 120 include UE scheduling 221 and MIMO precoding 222. On the fronthaul link 130 CSI compression 231 data is transferred from RRU 110 to BBU 120, and UE scheduling and precoding information notification 232 is transferred from BBU 120 to RRU 110.

FIG. 2 shows a scenario in which an eNB of massive MIMO system 200 is functionally partitioned into two physical units, i.e. an RRU 110 (including RRH 211) and a BBU 120, which are connected by a high-speed fronthaul link 130. The functions of the RRU 110 and the BBU 120 are mainly radio related and baseband related, respectively. The RRH 211 inside of the RRU 110 transmits and receives radio signals, and the RRU 110 has some limited capabilities for signal preprocessing, such as FFT/iFFT, channel estimation etc.

In TDD system, the RRU 110 performs MIMO channel estimation based on uplink sounding reference signals (SRS). After that, a CSI is obtained for each UE at the RRU 110. A CSI of a UE is referred as the MIMO channel vector between the eNB and that UE. Consider that there are K UEs served in massive MIMO system, e.g. according to the scenario of FIG. 1. The CSI of UE k ($1 \leq k \leq K$) on any one of subcarriers can be denoted as $$h_k = [h_{k,1}, h_{k,2}, \ldots, h_{k,N}]^T,$$

where N is the dimension of the MIMO channel vector, and $h_{k,n}$ is the n-th element of the MIMO channel vector. Considering the dimension of the MIMO channel vector is the product of TX and RX antenna numbers at the RRU 110 and the UE, the value of N in practice can be large, e.g., N=64*8.

The multi-UEs CSI matrix is by aggregating the vectors of all K UEs' CSI into a matrix as $$H = [h_1, h_2, \ldots, h_K].$$

CSI delivery schemes deliver $h_k$ for UE k from the RRU 110 to the BBU 120 directly in the fronthaul. Apparently, the size of multi-UEs' CSI matrix is N*K, which scales up with the dimension of MIMO channel vector, or equivalently, the size of antenna array in massive MIMO system. If measured by scalars, multi-UEs' CSI matrix contains 2N*K elements to be delivered.

In massive MIMO systems, a typical value of N=256 and K=20 means that there are 10240 scalars to be delivered in fronthaul for a single subcarrier. As system bandwidth expands in 5G era, the delivery of CSI from the RRU 110 to the BBU 120 can consume a tremendous amount of fronthaul bandwidth if not well-designed.

A simple solution to this problem is to apply CSI compression techniques in fronthaul. For example, given the CSI $h_k$ at the RRU, an optimal quantizer can be applied to quantize $h_k$ and then the quantization index is delivered from the RRU 110 to the BBU 120 in fronthaul 130 so as to save bandwidth. However, this approach only alleviates the problem to some extent, far from being a fundamental solution. This is because in theory the performance limit of quantization increases with the size of antenna array generally. Therefore, improving compression techniques to CSI delivery schemes do not work efficiently in massive MIMO systems.

In the following, a new CSI delivery scheme is described. This disclosure introduces a new correlation-relationship matrix for the CSI of all UE as $$\rho = H^H H = \begin{bmatrix} \rho_{1,1} & \cdots & \rho_{1,K} \\ \vdots & \ddots & \vdots \\ \rho_{K,1} & \cdots & \rho_{K,K} \end{bmatrix},$$

where the element of $$\rho_{k,l} = h_k^H h_l$$

is the complex correlation coefficient between the pair of CSI of UE k and UE l. The size of correlation-relationship matrix is K*K with the fundamental feature that it does not scale up with the dimension of MIMO channel vector any more. Thus, the new correlation-relationship matrix $\rho$ is quite different from multi-UEs' CSI matrix H.

As a step further, it can be observed that the matrix $\rho$ is Hermitian. Thus, only half of the matrix, i.e. upper (or lower) triangle part of $\rho$, needs to be delivered, which is $$\rho_{net} = \begin{bmatrix} \rho_{1,1} & \cdots & \rho_{1,K} \\ 0 & \ddots & \vdots \\ 0 & 0 & \rho_{K,K} \end{bmatrix}$$

This way, the amount of variables to be delivered becomes K(K+1)/2. If measured by scalars, it contains K*K scalars to compress since the diagonals are scalars only.

When K is smaller than 2N, the amount of information in new CSI delivery scheme is reduced from compression schemes described above. As suggested by 3GPP simulation parameters, the active number of UEs per RRU 110 in most cases is usually ranged from K=10 to 30, which is less than 2N generally.

Compared to compression-based schemes delivering H, the requirement bandwidth of new scheme delivering $\rho_{net}$ in fronthaul is reduced by $$\eta = 1 - \frac{K}{2N}$$

The improved performance of reduced bandwidth for CSI delivery under typical settings of N and K are shown in Table 1.

TABLE 1

Bandwidth reduction in fronthaul by disclosed CSI delivery scheme

| η | K = 10 | K = 20 | K = 30 |
|---|--------|--------|--------|
| N = 16 | 68.75% | 37.50% | 6.25% |
| N = 32 | 84.38% | 68.75% | 53.13% |
| N = 64 | 92.19% | 84.38% | 76.56% |

The correlation-relationship matrix $\rho$ can function similar to the original multi-UEs' CSI matrix H in the UE MIMO scheduling and precoding with no performance loss as shown in the following.

The BBU needs to schedule THE UE by relying only on the information of correlation-relationship matrix $\rho$ in some cases. For example, if the number of candidate UEs is larger than the supportable MIMO rank in transmission. There are many types of MIMO scheduling algorithms. A widely used MIMO scheduler in spatial domain is greedy MIMO scheduling, which is provided in Table 2 for scheduling T UEs from N UEs for SDMA access in massive MIMO systems.

TABLE 2

Greedy algorithm for MU-MIMO scheduling

Input:     U = {1, ... , K} is the candidate UE set for MU-MIMO scheduling.
    Output:    S   is the scheduled UE set with T UEs.
R( S   ) denotes the sum-rate achieved by MU-MIMO transmission for a UE set S .
 • Step 1: set k = 1, find a user $u_1$ such that
     $u_1 = \mathrm{argmax}_{u \in U} R(u)$
 Update $S_1 = \{u_1\}$.
 • Step 2: while k<T, k=k+1, find a user $u_k$ such that
     $u_k = \mathrm{argmax}_{u \in U/S_{k-1}} R(S_{k-1} \cup u)$
 Update $S_k = S_{k-1} \cup u_k$.
 Step 3. $S = S_k$, $R(S) = R(S_k)$ The above MIMO scheduling algorithm is compatible to the widely-applied time-domain scheduling algorithm. For example, when proportional fairness scheduler (PFS) is considered, the sum-rate of MIMO scheduling can be calculated as $$R(S) = \sum_{k=1}^{T} w_{u_k} R(u_k),$$

where $w_{u_k}$ is the proportional fairness factor in scheduling from time domain.

The rate of UE $u_k$ under MU-MIMO transmission depends on the used specific MU-MIMO precoding scheme. In practice, Zero-forcing (ZF) or MMSE precoding schemes are two types of widely-adopted MU-MIMO precoding. The explicit form of ZF and MMSE precoding is given respectively as $$P_{ZF} = H_s(H_s^H H_s)^{-1}, P_{MMSE} = H_s(H_s^H H_s + 1)^{-1},$$

where $P_{ZF}$ and $P_{MMSE}$ should be normalized into a set of unit-norm precoders, and $H_S$ is the multi-UEs' CSI matrix formed by a UE set S.

The correlation-relationship matrix about $H^H H$ is delivered from the RRU to the BBU, rather than multi-UE's CSI matrix H. This means the ZF and MMSE precoders are actually not available at the BBU.

Although the BBU 120 does not know the multi-UE's CSI matrix H, the corresponding rate of UE $u_k$ can be calculated by using only the correlation-relationship matrix $H^H H$. In mathematicas, after ZF or MMSE precoding, the SINR of UE $u_k$ in a UE set S is derived as $$\gamma_{ZF}(u_k) = \frac{1}{(H_s^H H_S)_{k,k}^{-1}}, \gamma_{MMSE}(u_k) = 1 \Big/ (H_s^H H_S + I)_{k,k}^{-1} - 1.$$

It means the rate of UE $u_k$ in a UE set S can be expressed as $$R_{ZF}(u_k) = \log\left(1 + \frac{1}{(\rho_S)_{k,k}^{-1}}\right), R_{MMSE}(u_k) = \log(1/(\rho_S + I)_{k,k}^{-1}).$$

Thus, in this disclosure the BBU can rely on $\rho$ in the MU-MIMO scheduling. To do this, the rate of UE $u_k$ in a temporary UE set $S_n$ during the MU-MIMO scheduling is calculated as $$R_{ZF}(u_k) = \log\left(1 + \frac{1}{(\rho_{S_n})_{k,k}^{-1}}\right), R_{MMSE}(u_k) = \log\left(1/(\rho_{S_n} + I)_{k,k}^{-1}\right)$$

$$R(S_n) = \sum_{u_k \in S_n} w_{u_k} R_{ZF}(u_k), \text{ or}$$

$$R(S_n) = \sum_{u_k \in S_n} w_{u_k} R_{MMSE}(u_k),$$

where $$\rho_{S_n} = \begin{bmatrix} \rho_{u_1,u_1} & \cdots & \rho_{u_1,u_n} \\ \vdots & \ddots & \vdots \\ \rho_{u_n,u_1} & \cdots & \rho_{u_n,u_n} \end{bmatrix}.$$

In the following, MIMO Precoding Information Notification from the BBU to the RRU is described. As the multi-UEs' CSI matrix is not delivered from the RRU 110 to the BBU 120, the BBU 120 cannot generate a full MU-MIMO precoder for the scheduled UEs. To solve this problem, the two-part precoder is introduced here. The full precoder of a UE consists of two parts. One is generated at the BBU 120 with calculations as $$P_{ZF,2}(\rho_S), \text{ or } P_{MMSE,2} = (\rho_S + 1)^{-1}.$$

Another part is known at the RRU 110 which does not require any calculations $$P_{ZF,1} = P_{MMSE,1} = H_s.$$

The BBU 120 delivers back the scheduled UE set S, the rate information R(S) (or link adaptation information such as MCS level) and the partial precoder $P_{ZF,2}$ or $P_{MMSE,2}$ to the RRU 110. The RRU 110 constructs the full MIMO ZF or MMSE precoder as $$P_{ZF} = P_{ZF,1} P_{ZF,2} \text{ or } P_{MMSE} = P_{MMSE,1} P_{MMSE,2}.$$

The method of two-part MIMO precoder generation gives an improvement to precoder information notification for compression based CSI delivery schemes (i.e. the one-part design) as described above.

In compression-based CSI delivery schemes (i.e. one part design) as described above, if not dividing precoders in two parts, the full precoder of each UE is notified from the BBU 120 to the RRU 110 in fronthaul 130, which is of size of N*T. In contrast, by using the two-part design described above, the partial precoder information in notification is of size T*T. Then, the efficiency of precoder information notification with and without the two-part precoder design is improved by $$\eta = 1 - \frac{T}{N}.$$

Under typical system settings, such improvement is shown in Table 3.

TABLE 3

Bandwidth reduction in fronthaul for precoder information notification by a two-part precoder design

| η | T = 2 | T = 4 | T = 8 |
|---|---|---|---|
| N = 16 | 87.50% | 75% | 50% |
| N = 32 | 93.75% | 87.5% | 75% |
| N = 64 | 96.88% | 93.75% | 87.5% |

Therefore, the disclosure introduces a new CSI delivery scheme with much less amount of CSI information and precoder information to be delivered in the fronthaul of multi-user massive MIMO systems, while not sacrificing any performance from the above-indexed simple solution.

Figure 3:
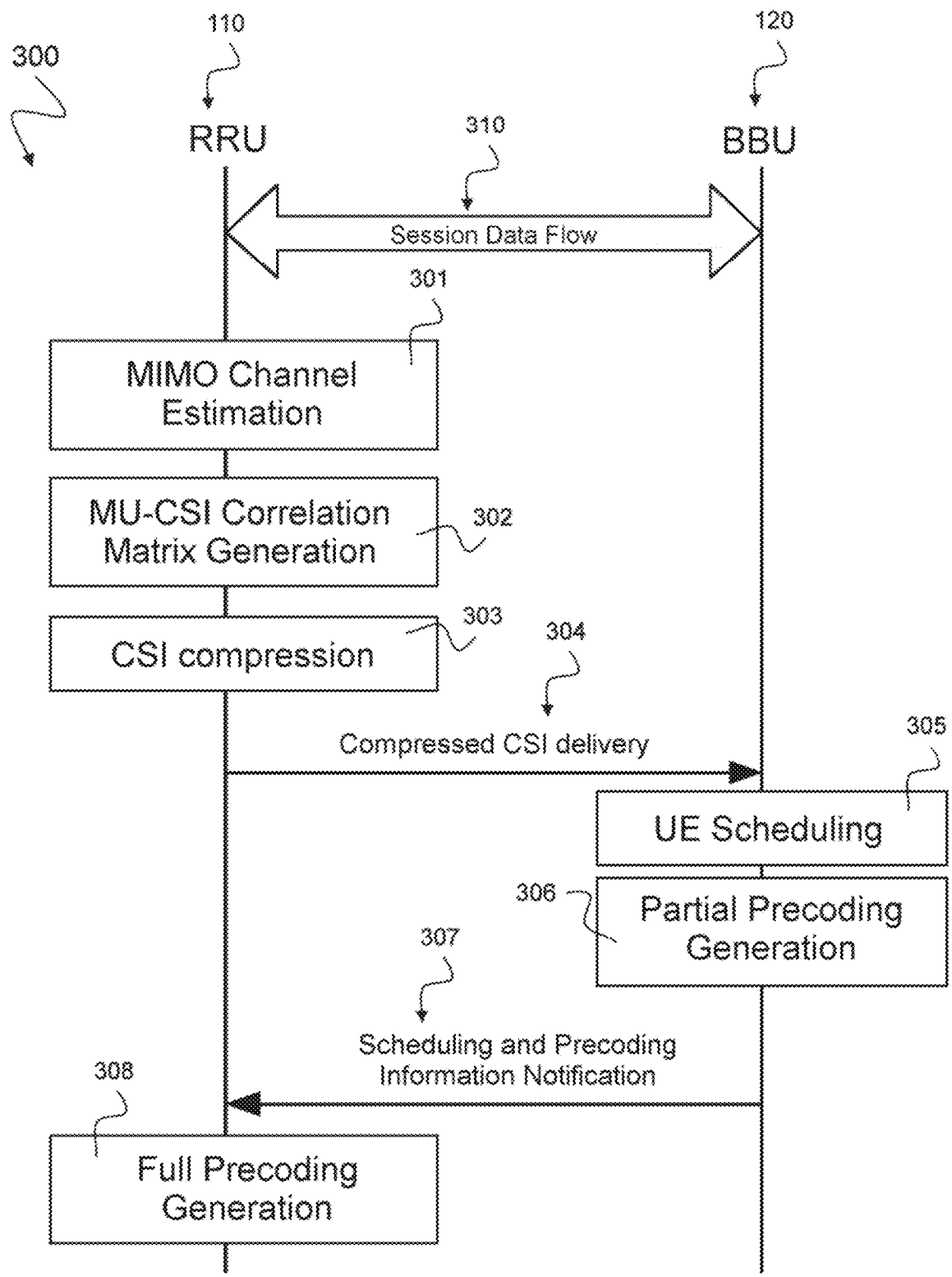
FIG. 3 is a flowchart 300 of a session data flow illustrating a CSI delivery scheme according to the disclosure.

FIG. 3 is a flowchart 300 of a session data flow 310 illustrating a CSI delivery scheme according to the disclosure. The session data flow 310 includes three blocks performed at the RRU 110 which are: MIMO channel estimation 301, MU-CSI correlation matrix generation 302 and CSI compression 303. Then, compressed CSI is delivered 304 from the RRU 110 to the BBU 120 and the two blocks UE scheduling 305 and partial precoding generation 306 are performed at the BBU 120. Then, scheduling and precoding information is notified 307 from the BBU 120 to RRU and full precoding generation 308 is performed at the RRU 110.

In the first block, MIMO Channel Estimation 301, the RRU performs channel estimation and acquires the CSI of MIMO channel vector for each UE, e. g. based on sounding reference signals (SRS) in uplink. The CSI of UE on any one of subcarrier is denoted as $$h_k = [h_{k,1}, h_{k,2}, \ldots, h_{k,N}]^T,$$

where N is the length of CSI in MIMO vector, and $h_{k,n}$ is the n-th element in the CSI.

The multi-UEs' CSI matrix for all K UEs is denoted as $$H = [h_1, h_2, \ldots, h_K].$$

In the second block, Correlation-relationship Matrix Generation 302, the RRU 110 then generates a triangle correlation-relationship matrix from multi-UEs' CSI matrix H as $$\rho_{net} = \begin{bmatrix} \rho_{1,1} & \cdots & \rho_{1,K} \\ 0 & \ddots & \vdots \\ 0 & 0 & \rho_{K,K} \end{bmatrix}$$

where $$\rho_{k,l} = h_k^H h_l.$$

In the third block, CSI Compression 303, a CSI compression technique is applied to compress the triangle correlation-relationship matrix $\rho_{net}$, which compress the contained K*K scalars into as few bits as possible. The CSI compression technique depends on implementation, which can be, but is not limited to, a universal quantizer, or other quantizer optimized for $\rho_{net}$.

In the fourth item, Compressed CSI Delivery 304 is performed. The bits of compressed CSI are delivered in fronthaul from the RRU to the BBU by using a common interface, e.g. a CPRI interface.

In the fifth step, UE Scheduling 305, the BBU firstly recovers the full correlation-relationship matrix ρ based on received triangle correlation-relationship matrix $\rho_{net}$, which is expressed as $$\rho = \rho_{net} + \rho_{net}^H - \text{diag}(\rho_{net}),$$

where diag(row net) denotes the diagonal operation to a matrix, e.g. as defined as a Matlab command.

The BBU performs MU-MIMO scheduling by employing the received correlation-relationship matrix ρ. One example of MU-MIMO scheduler can be greedy algorithm shown in block 2.b. The rate of UE $u_k$ in a temporary UE set $S_n$ (1≤n≤T) during the MU-MIMO scheduling is calculated as $$R_{ZF}(u_k) = \log\left(1 + \frac{1}{(\rho_{S_n})_{k,k}^{-1}}\right), R_{MMSE}(u_k) = \log\left(1/(\rho_{S_n} + I)_{k,k}^{-1}\right)$$

$$R(S_n) = \sum_{u_k \in S_n} w_{u_k} R_{ZF}(u_k), \text{ or}$$

$$R(S_n) = \sum_{u_k \in S_n} w_{u_k} R_{MMSE}(u_k),$$

where $$\rho_{S_n} = \begin{bmatrix} \rho_{u_1,u_1} & \cdots & \rho_{u_1,u_n} \\ \vdots & \ddots & \vdots \\ \rho_{u_n,u_1} & \cdots & \rho_{u_n,u_n} \end{bmatrix}.$$

The weight information for UE $W_{u_k}$ depends on the scheduling policy applied in massive MIMO system. It can be a proportional fairness factor or may be different depending on the respective implementation.

In the sixth step, Partial MIMO Precoding Generation at the BBU 306, the BBU generates the partial precoding information for the scheduled UE set S as $$P_{ZF,2}(\rho_S)^{-1}, P_{MMSE,2} = (\rho_S + 1)^{-1}.$$

In the seventh step, Precoding and Scheduling Information Notification 307, the BBU delivers back the scheduled UE set S, the rate information R(S) (or link adaptation information such as MCS level), and the partial precoding $P_{ZF,2}$ or $P_{MMSE,2}$ to RRU via fronthaul.

In the eighth step, Full Precoding Generation at the RRU 308, the RRU constructs the full MIMO ZF or MMSE precoder as $$P_{ZF} = P_{ZF,1} P_{ZF,2} \text{ or } P_{MMSE} = P_{MMSE,1} P_{MMSE,2},$$

where $$P_{ZF,1} = P_{MMSE,1} = H_s.$$

The new scheme according to this disclosure can be characterized by the following two key points. A first key point is improved CSI Delivery. A new CSI delivery scheme is presented in this disclosure, where implicit CSI in terms of correlation-relationship matrix is delivered from the RRU to the BBU in fronthaul. The amount of implicit CSI to be delivered does not scale up with the size of antenna array, which is especially important in massive MIMO systems. The efficiency of CSI delivery is improved by a factor of $$\eta = 1 - \frac{K}{2N},$$

which is significant when the number of UE K for scheduling is far less than the size of antenna array N.

A second key point is improved precoder information notification. The precoder information delivery from the BBU to the RRU is improved by using a two-part precoder generation scheme. Only the part of precoders requiring calculations are delivered from the BBU to the RRU while the remaining of precoders are not delivered since the RRU already knows it. In this way, the amount of information for precoder notification from the BBU to the RRU can be reduced from one-part precoder generation scheme. The efficiency of precoder information notification is improved by a factor of $$\eta = 1 - \frac{T}{N},$$

which is significant when the scheduled number of UE T is far less than the size of antenna array N.

Methods and devices according to the disclosure can be applied in wireless products, e.g. 3GPP-standard related to MIMO system below 6 Ghz, or massive MIMO millimeter wave system above 6 Ghz. Methods and devices according to the disclosure can also be applied in part of IEEE-standard wireless millimeter wave systems.

Figure 4:
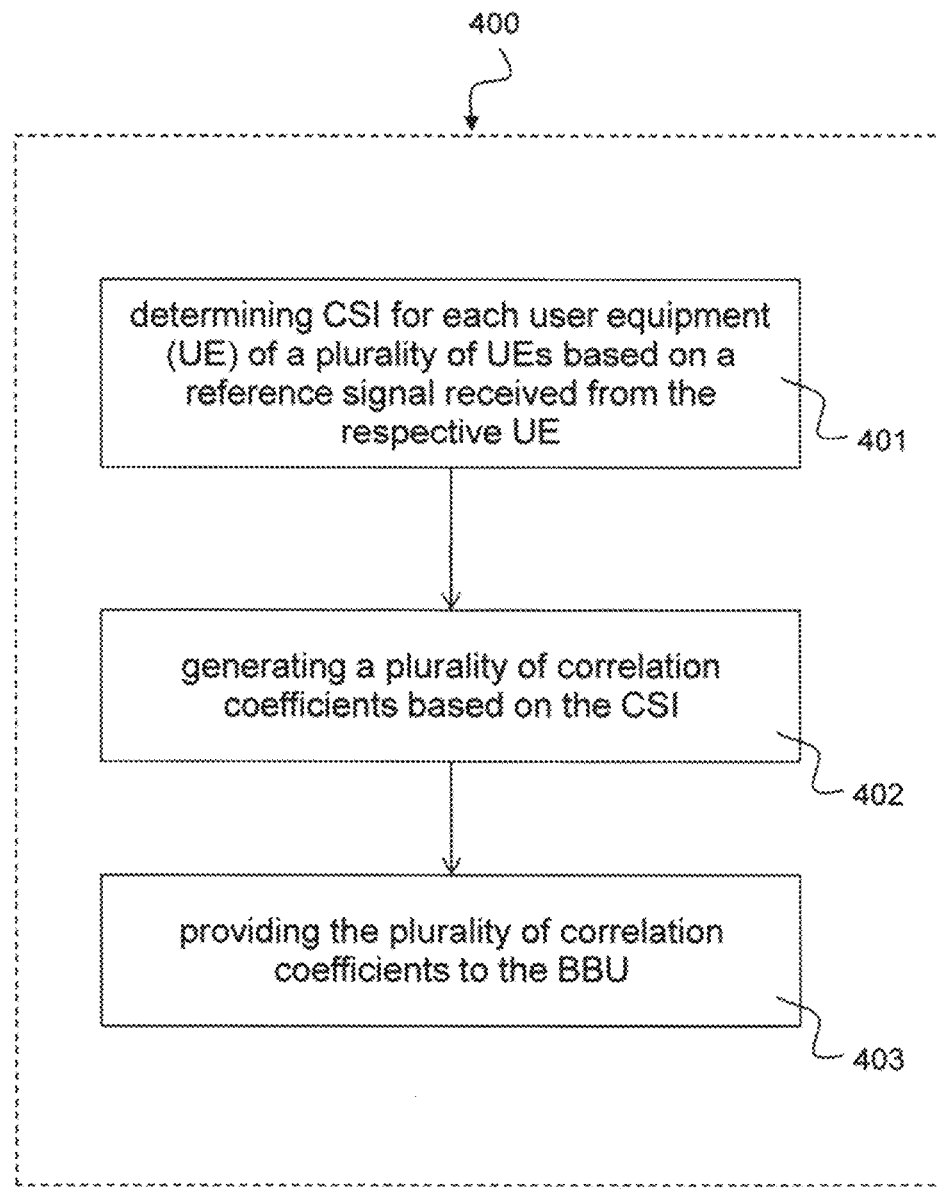
FIG. 4 is a schematic diagram illustrating a method 400 for providing channel state information (CSI) from an RRU to a BBU according to the disclosure.

FIG. 4 is a schematic diagram illustrating a method 400 for providing CSI from an RRU to a BBU according to the disclosure. The method 400 describes a general representation of a CSI delivery from a RRU 110 as described above with respect to FIGS. 1 to 3 to a BBU 120 as described above with respect to FIGS. 1 to 3, in particular a general representation of the four steps MIMO channel estimation 301, MU-CSI correlation matrix generation 302, CSI compression 303 and compressed CSI delivery 304 as described above with respect to FIG. 3.

The method 400 includes determining 401 CSI for each UE of a plurality of UEs, e.g. UEs 141, 142, 143, 144, 145 as shown in FIG. 1 based on a reference signal received from the respective UE. The method 400 includes generating 402 a plurality of correlation coefficients based on the CSI, e.g. as described above with respect to FIGS. 2 and 3. The method 400 includes providing 403 the plurality of correlation coefficients to the BBU, e.g. as described above with respect to FIGS. 2 and 3.

The method 400 may further include generating the plurality of correlation coefficients based on pairs of CSI determined for respective pairs of UEs, e.g. as described above with respect to FIGS. 2 and 3.

The method 400 may further include: compressing the plurality of correlation coefficients, e.g. according to a usual compression scheme; and providing the plurality of correlation coefficients in a compressed form. The method 400 may further include providing the plurality of correlation coefficients via a common public radio interface. The method 400 may further include providing the plurality of correlation coefficients via a fronthaul link 130 from the RRU 110 to the BBU 120, e.g. as described above with respect to FIGS. 2 and 3.

The method 400 may further include generating the plurality of correlation coefficients based on a correlation-relationship matrix of size K*K, wherein K is the number of UEs used to determine the CSIs, e.g. as described above with respect to FIGS. 2 and 3.

The method 400 may further include determining the correlation-relationship matrix based on a multi-UE CSI matrix including the CSIs determined for each UE, e.g. as described above with respect to FIGS. 2 and 3.

A size of the multi-UE CSI matrix may e.g. be N*K, wherein K is the number of UEs used to determine the CSIs and N is the dimension of a MIMO channel vector between a respective UE and the RRU, e.g. as described above with respect to FIGS. 2 and 3.

The multi-UE CSI matrix may be $H=[h_1, h_2, \ldots, h_K]$ with the MIMO channel vectors $h_k=[h_{k,1}, h_{k,2}, \ldots, h_{k,N}]^T$, wherein $h_k$, is the n-th element of the k-th MIMO channel vector $h_k$, e.g. as described above with respect to FIGS. 2 and 3.

The correlation-relationship matrix may be expressed as $$\rho = H^H H = \begin{bmatrix} \rho_{1,1} & \cdots & \rho_{1,K} \\ \vdots & \ddots & \vdots \\ \rho_{K,1} & \cdots & \rho_{K,K} \end{bmatrix},$$

wherein an element $\rho_{k,l} = h_k^H h_l$ of the correlation-relationship matrix is the complex correlation coefficient between the pair of CSI of a k-th UE and an l-th UE, e.g. as described above with respect to FIGS. 2 and 3.

The method 400 may further include generating the plurality of correlation coefficients based on a lower or upper triangle part of the correlation-relationship matrix, e.g. as described above with respect to FIGS. 2 and 3, which is $$\rho_{net} = \begin{bmatrix} \rho_{1,1} & \cdots & \rho_{1,K} \\ 0 & \ddots & \vdots \\ 0 & 0 & \rho_{K,K} \end{bmatrix}.$$

A compression rate for providing the plurality of correlation coefficients based on the correlation-relationship matrix versus providing the plurality of correlation coefficients based on the multi-UE CSI matrix can be $$\eta = 1 - \frac{K}{2N},$$

e.g. as described above with respect to FIGS. 2 and 3.

Figure 5:
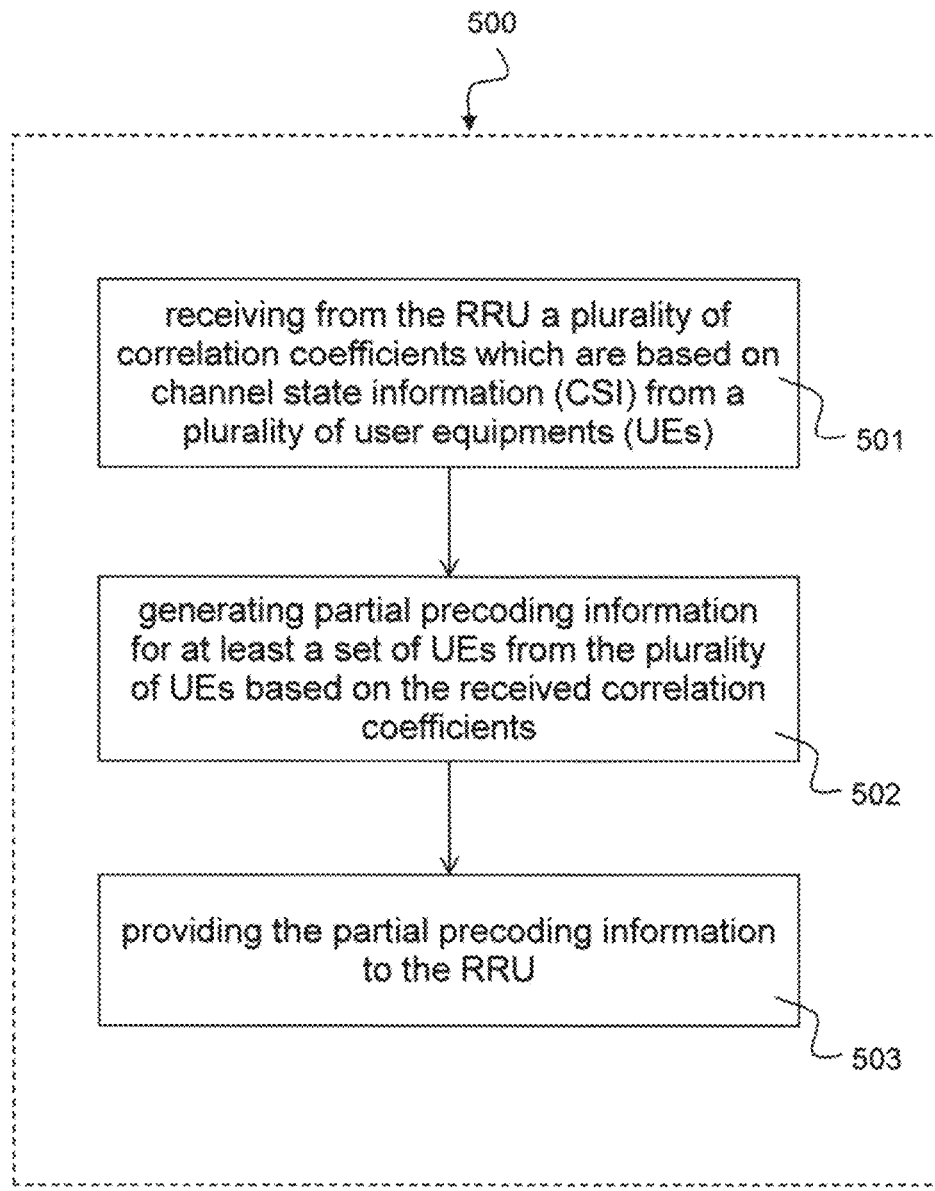
FIG. 5 is a schematic diagram illustrating a method 500 for providing precoding information from a BBU to an RRU according to the disclosure.

FIG. 5 is a schematic diagram illustrating a method 500 for providing precoding information from a BBU to an RRU according to the disclosure.

The method 500 describes a general representation of a scheme for scheduling and precoding information notification as described above with respect to FIGS. 1 to 3, in particular a general representation of the four steps UE scheduling 305, partial precoding generation 306, scheduling and precoding information notification 307 and full precoding generation 308 as described above with respect to FIG. 3.

The method 500 includes receiving 501 from the RRU 110 a plurality of correlation coefficients which are based on CSI from a plurality of UEs, e.g. according to the compressed CSI delivery 304 as described above with respect to FIG. 3.

The method 500 includes generating 502 partial precoding information for at least a set of UEs from the plurality of UEs based on the received correlation coefficients, e.g. as described above with respect to FIGS. 2 and 3. The method 500 further includes providing 503 the partial precoding information to the RRU, e.g. as described above with respect to FIGS. 2 and 3.

A remaining part of the precoding information may be known to the RRU, e.g. known by definition. The method 500 may further include: scheduling the set of UEs based on the received correlation coefficients based on a scheduling policy; and generating the partial precoding information for the scheduled set of UEs, e.g. as described above with respect to FIGS. 2 and 3. The scheduling policy is based on greedy scheduling, e.g. as described above with respect to FIGS. 2 and 3.

The method 500 may include providing at least one of information about the scheduled set of UEs, rate information and link adaptation information to the RRU. The method 500 may further include providing the partial precoding information via a fronthaul link from the BBU 120 to the RRU 110, e.g. as described above with respect to FIGS. 2 and 3.

Figure 6:
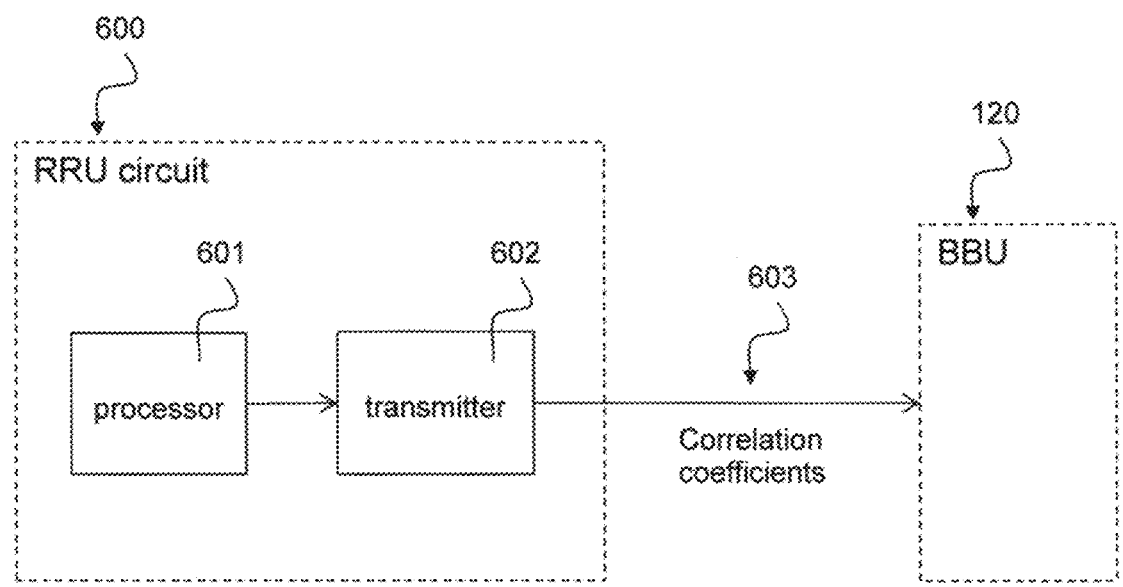
FIG. 6 is a schematic diagram illustrating an RRU circuit 600 providing CSI to a BBU according to the disclosure.

FIG. 6 is a schematic diagram illustrating an RRU circuit 600 providing CSI to a BBU according to the disclosure. The RRU circuit 600 may be implemented in a RRU 110 in order to perform the functionalities of the RRU 100 as described above with respect to FIGS. 1 to 3.

The RRU circuit 600 includes a processor 601 and a transmitter 602. The processor 601 is configured to determine CSI for each UE of a plurality of UEs based on a reference signal received from the respective UE and to generate a plurality of correlation coefficients 603 based on the CSI, e.g. as described above with respect to FIGS. 2 and 3. The transmitter 602 is configured to provide the plurality of correlation coefficients 603 to a baseband unit BBU 120, e.g. as described above with respect to FIGS. 2 and 3.

The processor 601 may be configured to generate the plurality of correlation coefficients 603 based on pairs of CSI determined for respective pairs of UEs, e.g. as described above with respect to FIGS. 2 and 3.

The processor 601 may be configured to compress the plurality of correlation coefficients 603, e.g. as described above with respect to FIGS. 2 and 3. The transmitter 602 may be configured to provide the plurality of correlation coefficients 603 in a compressed form.

The transmitter 602 may be configured to provide the plurality of correlation coefficients 603 via a common public radio interface. The transmitter 602 may be configured to provide the plurality of correlation coefficients 603 via a fronthaul link 130 to the BBU 120, e.g. as described above with respect to FIGS. 2 and 3.

The processor 601 may be configured to generate the plurality of correlation coefficients 603 based on a correlation-relationship matrix of size K*K, wherein K is the number of UEs used to determine the CSIs, e.g. as described above with respect to FIGS. 2 and 3.

The processor 602 may be configured to determine the correlation-relationship matrix based on a multi-UE CSI matrix including the CSIs determined for each UE, e.g. as described above with respect to FIGS. 2 and 3. A size of the multi-UE CSI matrix may be N*K, wherein K is the number of UEs used to determine the CSIs and N is the dimension of a MIMO channel vector between a respective UE and the RRU 110, e.g. as described above with respect to FIGS. 2 and 3.

The multi-UE CSI matrix can be expressed as $H = [h_1, h_2, \ldots, h_K]$ with the MIMO channel vectors $h_k = [h_{k,1}, h_{k,2}, \ldots, h_{k,N}]^T$, wherein $h_{k,n}$ is the n-th element of the k-th MIMO channel vector $h_k$, e.g. as described above with respect to FIGS. 2 and 3.

The correlation-relationship matrix can be expressed as $$\rho = H^H H = \begin{bmatrix} \rho_{1,1} & \cdots & \rho_{1,K} \\ \vdots & \ddots & \vdots \\ \rho_{K,1} & \cdots & \rho_{K,K} \end{bmatrix},$$

where an element $\rho_{k,l} = h_k^H h_l$ of the correlation-relationship matrix is the complex correlation coefficient between the pair of CSI of a k-th UE and an l-th UE, e.g. as described above with respect to FIGS. 2 and 3.

The processor 602 may be configured to generate the plurality of correlation coefficients based on a lower or upper triangle part of the correlation-relationship matrix, e.g. as described above with respect to FIGS. 2 and 3, which is $$\rho_{net} = \begin{bmatrix} \rho_{1,1} & \cdots & \rho_{1,K} \\ 0 & \ddots & \vdots \\ 0 & 0 & \rho_{K,K} \end{bmatrix}.$$

A compression rate for providing the plurality of correlation coefficients based on the correlation-relationship matrix versus providing the plurality of correlation coefficients based on the multi-UE CSI matrix can be $$\eta = 1 - \frac{K}{2N},$$

e.g. as described above with respect to FIGS. 2 and 3.

Figure 7:
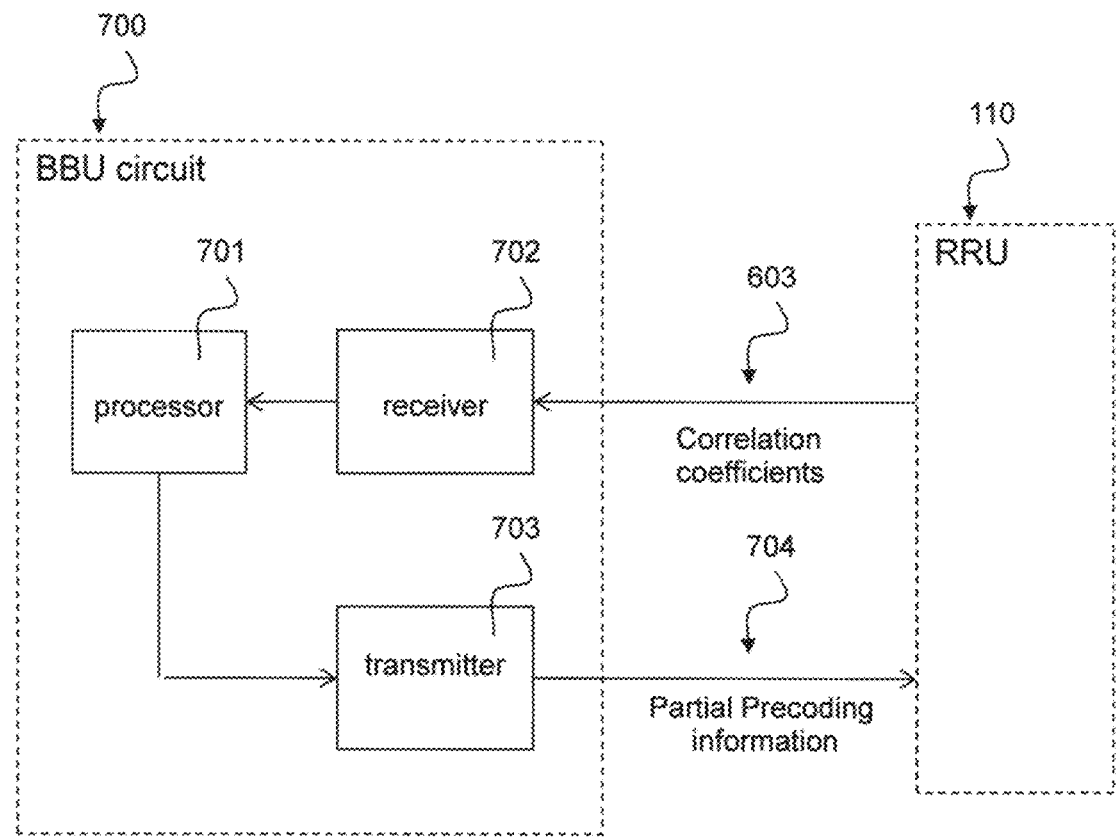
FIG. 7 is a schematic diagram illustrating a BBU circuit 700 providing precoding information to an RRU according to the disclosure.

FIG. 7 is a schematic diagram illustrating a BBU circuit 700 providing precoding information to an RRU according to the disclosure. The BBU circuit 700 may be implemented in a BBU 120 in order to perform the functionalities of the BBU 120 as described above with respect to FIGS. 1 to 3.

The baseband unit circuit includes a receiver 702, a processor 701 and a transmitter 703. The receiver 702 is configured to receive from an RRU 110, e.g. an RRU as described above with respect to FIGS. 1 to 3, a plurality of correlation coefficients 603 which are based on CSI from a plurality of UEs, e.g. as described above with respect to FIGS. 1 to 3. The processor 701 is configured to generate partial precoding information 704 for at least a set of UEs from the plurality of UEs based on the received correlation coefficients, e.g. as described above with respect to FIGS. 2 and 3. The transmitter 703 is configured to provide the partial precoding information 704 to the RRU 110. A remaining part of the precoding information may be known to the RRU 110, e.g. by definition.

The processor 701 may be configured to schedule the set of UEs based on the received correlation coefficients 603 based on a scheduling policy and to generate the partial precoding information 704 for the scheduled set of UEs, e.g. as described above with respect to FIGS. 2 and 3. The scheduling policy may be based on greedy scheduling, e.g. as described above with respect to FIGS. 2 and 3.

The transmitter 703 may be configured to provide at least one of information about the scheduled set of UEs, rate information and link adaptation information to the RRU. The transmitter 703 may be configured to provide the partial precoding information 704 via a fronthaul link 130 to the RRU 110, e.g. as described above with respect to FIGS. 2 and 3.

The devices and systems described in this disclosure may be implemented as Digital Signal Processors (DSP), microcontrollers or any other side-processor or hardware circuit on a chip or an application specific integrated circuit (ASIC).

Examples described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods described above with respect to FIGS. 2 to 5. Such a computer program product may include a readable storage medium storing program code thereon for use by a processor, the program code including instructions for performing the methods 300, 400, 500 as described above.

EXAMPLES

The following examples pertain to further embodiments. Example 1 is a method for providing CSI from an RRU to a BBU, the method comprising: determining CSI for each UE of a plurality of UEs based on a reference signal received from the respective UE; generating a plurality of correlation coefficients based on the CSI; and providing the plurality of correlation coefficients to the BBU.

In Example 2, the subject matter of Example 1 can optionally include: generating the plurality of correlation coefficients based on pairs of CSI determined for respective pairs of UEs.

In Example 3, the subject matter of any one of Examples 1-2 can optionally include: compressing the plurality of correlation coefficients; and providing the plurality of correlation coefficients in a compressed form.

In Example 4, the subject matter of any one of Examples 1-3 can optionally include: providing the plurality of correlation coefficients via a common public radio interface.

In Example 5, the subject matter of any one of Examples 1-4 can optionally include: providing the plurality of correlation coefficients via a fronthaul link from the RRU to the BBU.

In Example 6, the subject matter of any one of Examples 1-5 can optionally include: generating the plurality of correlation coefficients based on a correlation-relationship matrix of size K*K, wherein K is the number of UEs used to determine the CSIs.

In Example 7, the subject matter of Example 6 can optionally include: determining the correlation-relationship matrix based on a multi-UE CSI matrix comprising the CSIs determined for each UE.

In Example 8, the subject matter of Example 7 can optionally include that a size of the multi-UE CSI matrix is N*K, wherein K is the number of UEs used to determine the CSIs and N is the dimension of a MIMO channel vector between a respective UE and the RRU.

In Example 9, the subject matter of any one of Examples 7-8 can optionally include that the multi-UE CSI matrix is $H=[h_1, h_2, \ldots, h_K]$ with the MIMO channel vectors $h_k=[h_{k,1}, h_{k,2}, \ldots, h_{k,N}]^T$, wherein $h_{k,n}$ is the n-th element of the k-th MIMO channel vector $h_k$.

In Example 10, the subject matter of any one of Examples 6-9 can optionally include that the correlation-relationship matrix is $$\rho = H^H H = \begin{bmatrix} \rho_{1,1} & \cdots & \rho_{1,K} \\ \vdots & \ddots & \vdots \\ \rho_{K,1} & \cdots & \rho_{K,K} \end{bmatrix},$$

wherein an element $\rho_{k,l}=h_k^H h_l$ of the correlation-relationship matrix is the complex correlation coefficient between the pair of CSI of a k-th UE and an l-th UE.

In Example 11, the subject matter of Example 10 can optionally include: generating the plurality of correlation coefficients based on a lower or upper triangle part of the correlation-relationship matrix which is $$\rho_{net} = \begin{bmatrix} \rho_{1,1} & \cdots & \rho_{1,K} \\ 0 & \ddots & \vdots \\ 0 & 0 & \rho_{K,K} \end{bmatrix}.$$

In Example 12, the subject matter of any one of Examples 7-11 can optionally include that a compression rate for providing the plurality of correlation coefficients based on the correlation-relationship matrix versus providing the plurality of correlation coefficients based on the multi-UE CSI matrix is $$\eta = 1 - \frac{K}{2N}.$$

Example 13 is a method for providing precoder information from a BBU to an RRU, the method comprising: receiving from the RRU a plurality of correlation coefficients which are based on CSI from a plurality of UEs; generating partial precoding information for at least a set of UEs from the plurality of UEs based on the received correlation coefficients; and providing the partial precoding information to the RRU.

In Example 14, the subject matter of Example 13 can optionally include that a remaining part of the precoding information is known to the RRU.

In Example 15, the subject matter of any one of Examples 13-14 can optionally include: scheduling the set of UEs based on the received correlation coefficients based on a scheduling policy; and generating the partial precoding information for the scheduled set of UEs.

In Example 16, the subject matter of Example 15 can optionally include that the scheduling policy is based on greedy scheduling.

In Example 17, the subject matter of any one of Examples 15-16 can optionally include: providing at least one of information about the scheduled set of UEs, rate information and link adaptation information to the RRU.

In Example 18, the subject matter of any one of Examples 13-17 can optionally include: providing the partial precoding information via a fronthaul link from the BBU to the RRU.

Example 19 is an RRU circuit, comprising: a processor configured to determine CSI for each UE of a plurality of UEs based on a reference signal received from the respective UE and to generate a plurality of correlation coefficients based on the CSI; and a transmitter configured to provide the plurality of correlation coefficients to a BBU.

In Example 20, the subject matter of Example 19 can optionally include that the processor is configured to generate the plurality of correlation coefficients based on pairs of CSI determined for respective pairs of UEs.

In Example 21, the subject matter of any one of Examples 19-20 can optionally include that the processor is configured to compress the plurality of correlation coefficients; and that the transmitter is configured to provide the plurality of correlation coefficients in a compressed form.

In Example 22, the subject matter of any one of Examples 19-21 can optionally include that the transmitter is configured to provide the plurality of correlation coefficients via a common public radio interface.

In Example 23, the subject matter of any one of Examples 19-22 can optionally include that the transmitter is configured to provide the plurality of correlation coefficients via a fronthaul link to the BBU.

In Example 24, the subject matter of any one of Examples 19-23 can optionally include that the processor is configured to generate the plurality of correlation coefficients based on a correlation-relationship matrix of size K*K, wherein K is the number of UEs used to determine the CSIs.

In Example 25, the subject matter of Example 24 can optionally include that the processor is configured to determine the correlation-relationship matrix based on a multi-UE CSI matrix comprising the CSIs determined for each UE.

In Example 26, the subject matter of Example 25 can optionally include that a size of the multi-UE CSI matrix is N*K, wherein K is the number of UEs used to determine the CSIs and N is the dimension of a MIMO channel vector between a respective UE and the RRU.

In Example 27, the subject matter of any one of Examples 25-26 can optionally include that the multi-UE CSI matrix is H=[h$_1$, h$_2$, . . . , h$_K$] with the MIMO channel vectors h$_k$=[h$_{k,1}$, h$_{k,2}$, . . . , h$_{k,N}$]$^T$ wherein h$_k$, is the n-th element of the k-th MIMO channel vector h$_k$ In Example 28, the subject matter of any one of Examples 24-27 can optionally include that the correlation-relationship matrix is $$\rho = H^H H = \begin{bmatrix} \rho_{1,1} & \cdots & \rho_{1,K} \\ \vdots & \ddots & \vdots \\ \rho_{K,1} & \cdots & \rho_{K,K} \end{bmatrix},$$

where an element $\rho_{k,l} = h_k^H h_l$ of the correlation-relationship matrix is the complex correlation coefficient between the pair of CSI of a k-th UE and an l-th UE.

In Example 29, the subject matter of Example 28 can optionally include that the processor is configured to generate the plurality of correlation coefficients based on a lower or upper triangle part of the correlation-relationship matrix which is $$\rho_{net} = \begin{bmatrix} \rho_{1,1} & \cdots & \rho_{1,K} \\ 0 & \ddots & \vdots \\ 0 & 0 & \rho_{K,K} \end{bmatrix}.$$

In Example 30, the subject matter of any one of Examples 25-29 can optionally include that a compression rate for providing the plurality of correlation coefficients based on the correlation-relationship matrix versus providing the plurality of correlation coefficients based on the multi-UE CSI matrix is $$\eta = 1 - \frac{K}{2N}.$$

Example 31 is a BBU circuit, comprising: a receiver configured to receive from an RRU a plurality of correlation coefficients which are based on CSI from a plurality of UEs; a processor configured to generate partial precoding information for at least a set of UEs from the plurality of UEs based on the received correlation coefficients; and a transmitter configured to provide the partial precoding information to the RRU.

In Example 32, the subject matter of Example 31 can optionally include that a remaining part of the precoding information is known to the RRU.

In Example 33, the subject matter of any one of Examples 31-32 can optionally include that the processor is configured to schedule the set of UEs based on the received correlation coefficients based on a scheduling policy and to generate the partial precoding information for the scheduled set of UEs.

In Example 34, the subject matter of Example 33 can optionally include that the scheduling policy is based on greedy scheduling.

In Example 35, the subject matter of any one of Examples 33-34 can optionally include that the transmitter is configured to provide at least one of information about the scheduled set of UEs, rate information and link adaptation information to the RRU.

In Example 36, the subject matter of any one of Examples 31-35 can optionally include that the transmitter is configured to provide the partial precoding information via a fronthaul link to the RRU.

Example 37 is a remote radio unit (RRU), comprising: means for determining CSI for each UE of a plurality of UEs based on a reference signal received from the respective UE; means for generating a plurality of correlation coefficients based on the CSI; and means for providing the plurality of correlation coefficients to the BBU.

In Example 38, the subject matter of Example 37 can optionally include: means for compressing the plurality of correlation coefficients; and means for providing the plurality of correlation coefficients in a compressed form.

Example 39 is a BBU, comprising: means for receiving from an RRU a plurality of correlation coefficients which are based on CSI from a plurality of UEs; means for generating partial precoding information for at least a set of UEs from the plurality of UEs based on the received correlation coefficients; and means for providing the partial precoding information to the RRU.

In Example 40, the subject matter of Example 39 can optionally include that a remaining part of the precoding information is known to the RRU.

Example 41 is a base station system, comprising an RRU and a BBU, wherein the RRU is configured to: determine for each UE of a plurality of UEs CSI based on a reference signal received from the respective UE, generate a plurality of correlation coefficients based on the CSI, and provide the plurality of correlation coefficients to the BBU, wherein the BBU is configured to: receive from the RRU the plurality of correlation coefficients, generate partial precoding information for at least a set of UEs from the plurality of UEs based on the received correlation coefficients, and provide the partial precoding information to the RRU.

In Example 42, the subject matter of Example 41 can optionally include that the RRU is configured to generate full precoding information based on the partial precoding information provided from the BBU and a remaining part of the precoding information known to the RRU.

Example 43 is a computer readable non-transitory medium on which computer instructions are stored which when executed by a computer cause the computer to perform the method of any one of Examples 1 to 18.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A method for providing channel state information (CSI) from a remote radio unit (RRU) to a baseband unit (BBU), the method comprising:
   determining CSI for each user equipment (UE) of a plurality of UEs based on a reference signal received from the respective UE;
   generating a plurality of correlation coefficients based on pairs of the CSI determined for respective pairs of UEs; and
   providing the plurality of correlation coefficients to the BBU.

2. The method of claim 1, comprising:
   compressing the plurality of correlation coefficients; and
   providing the plurality of correlation coefficients in a compressed form.

3. The method of claim 1, comprising:
   providing the plurality of correlation coefficients via a common public radio interface.

4. The method of claim 1, comprising:
   providing the plurality of correlation coefficients via a fronthaul link from the RRU to the BBU.

5. The method of claim 1, comprising:
   generating the plurality of correlation coefficients based on a correlation-relationship matrix of size K*K, wherein K is the number of UEs used to determine the CSIs.

6. The method of claim 5, comprising:
   determining the correlation-relationship matrix based on a multi-UE CSI matrix comprising the CSIs determined for each UE.

7. The method of claim 6,
   wherein a size of the multi-UE CSI matrix is N*K, wherein K is the number of UEs used to determine the CSIs and N is the dimension of a MIMO channel vector between a respective UE and the RRU.

8. The method of claim 6,
   wherein the multi-UE CSI matrix is $$H = [h_1, h_2, \ldots, h_K]$$

with the MIMO channel vectors $$h_k=[h_{k,1},h_{k,2},\ldots,h_{k,N}]^T$$

wherein $h^{k,n}$ is the n-th element of the k-th MIMO channel vector $h_k$.

9. The method of claim 5,
wherein the correlation-relationship matrix is $$\rho = H^H H = \begin{bmatrix} \rho_{1,1} & \cdots & \rho_{1,K} \\ \vdots & \ddots & \vdots \\ \rho_{K,1} & \cdots & \rho_{K,K} \end{bmatrix},$$

wherein an element $\rho_{k,l}=h_k^H h_l$ of the correlation-relationship matrix is the complex correlation coefficient between the pair of CSI of a k-th UE and an l-th UE.

10. The method of claim 9, comprising:
generating the plurality of correlation coefficients based on a lower or upper triangle part of the correlation-relationship matrix which is $$\rho_{net} = \begin{bmatrix} \rho_{1,1} & \cdots & \rho_{1,K} \\ 0 & \ddots & \vdots \\ 0 & 0 & \rho_{K,K} \end{bmatrix}.$$

11. The method of claim 6,
wherein a compression rate for providing the plurality of correlation coefficients based on the correlation-relationship matrix versus providing the plurality of correlation coefficients based on the multi-UE CSI matrix is $$\eta = 1 - \frac{K}{2N}.$$

12. A method for providing precoder information from a baseband unit (BBU) to a remote radio unit (RRU), the method comprising:
receiving from the RRU a plurality of correlation coefficients which are based on channel state information (CSI) from a plurality of user equipments (UEs);
generating partial precoding information for at least a set of UEs from the plurality of UEs based on the received correlation coefficients; and
providing the partial precoding information to the RRU.

13. The method of claim 12,
wherein a remaining part of the precoding information is known to the RRU.

14. The method of claim 12, comprising:
scheduling the set of UEs based on the received correlation coefficients based on a scheduling policy; and
generating the partial precoding information for the scheduled set of UEs.

15. The method of claim 14,
wherein the scheduling policy is based on greedy scheduling.

16. The method of claim 14, comprising:
providing at least one of information about the scheduled set of UEs, rate information and link adaptation information to the RRU.

17. The method of claim 12, comprising:
providing the partial precoding information via a fronthaul link from the BBU to the RRU.

18. A remote radio unit (RRU) circuit, comprising:
a processor configured to determine channel state information (CSI) for each user equipment (UE) of a plurality of UEs based on a reference signal received from the respective UE, to generate a plurality of correlation coefficients based on pairs of the CSI determined for respective pairs of UEs; and
a transmitter configured to provide the plurality of correlation coefficients to a baseband unit (BBU).

19. The RRU circuit of claim 18,
wherein the processor is configured to compress the plurality of correlation coefficients; and
wherein the transmitter is configured to provide the plurality of correlation coefficients in a compressed form.

20. The RRU circuit of claim 18,
wherein the transmitter is configured to provide the plurality of correlation coefficients via a common public radio interface.

21. A baseband unit (BBU) circuit, comprising:
a receiver configured to receive from a remote radio unit (RRU) a plurality of correlation coefficients which are based on channel state information (CSI) from a plurality of user equipments (UEs);
a processor configured to generate partial precoding information for at least a set of UEs from the plurality of UEs based on the received correlation coefficients; and
a transmitter configured to provide the partial precoding information to the RRU.

22. The BBU circuit of claim 21,
wherein a remaining part of the precoding information is known to the RRU.

23. The BBU circuit of claim 21,
wherein the processor is configured to schedule the set of UEs based on the received correlation coefficients based on a scheduling policy and to generate the partial precoding information for the scheduled set of UEs.

* * * * *